Feb. 22, 1938.
H. S. BOGATY
2,109,409
APPARATUS FOR BLENDING AND CONDITIONING TOBACCO
Filed Aug. 3, 1933
7 Sheets-Sheet 1
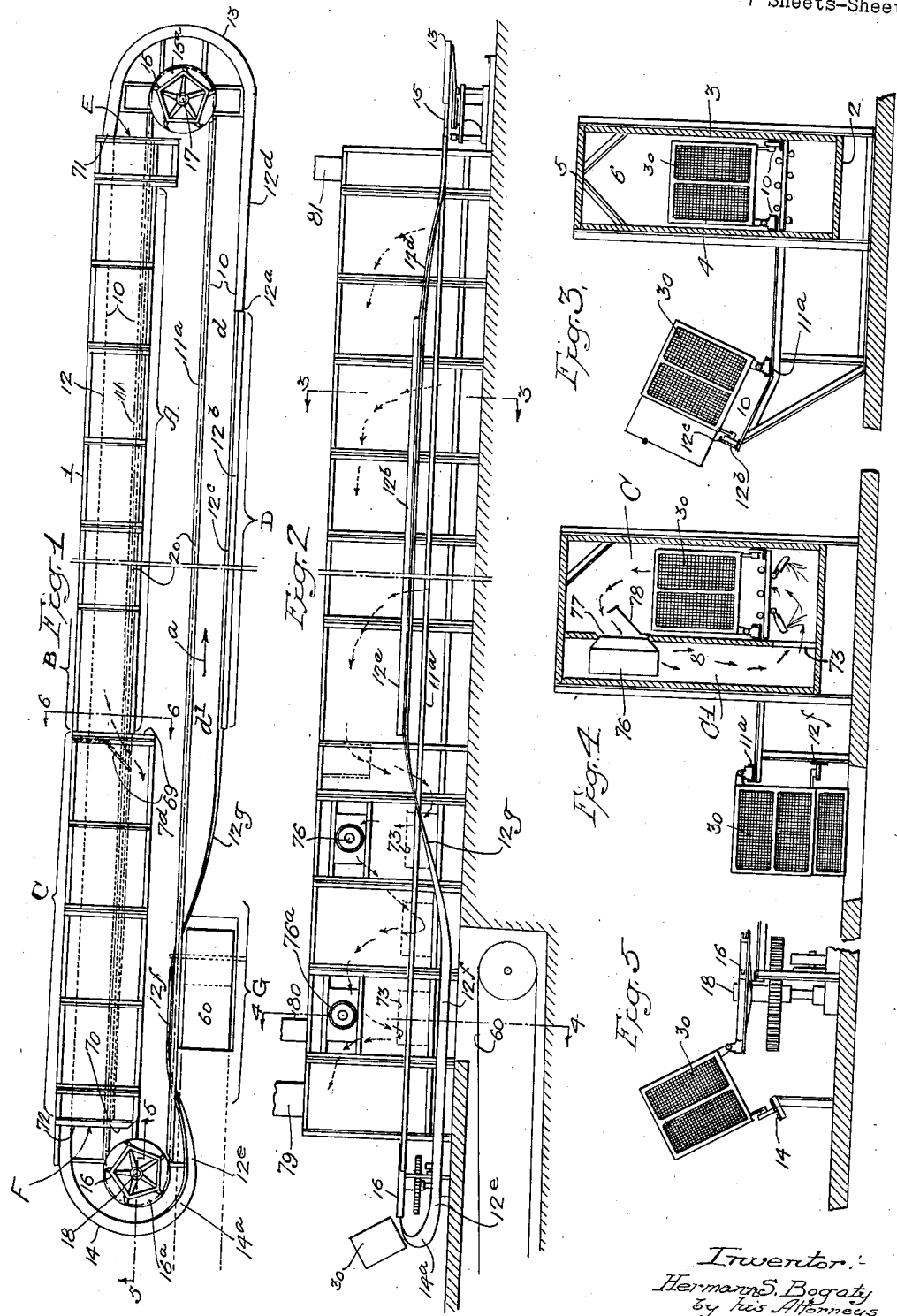
Inventor:
Hermann S. Bogaty
by his Attorneys
Howson & Howson Feb. 22, 1938.   H. S. BOGATY   2,109,409
APPARATUS FOR BLENDING AND CONDITIONING TOBACCO
Filed Aug. 3, 1933   7 Sheets-Sheet 2
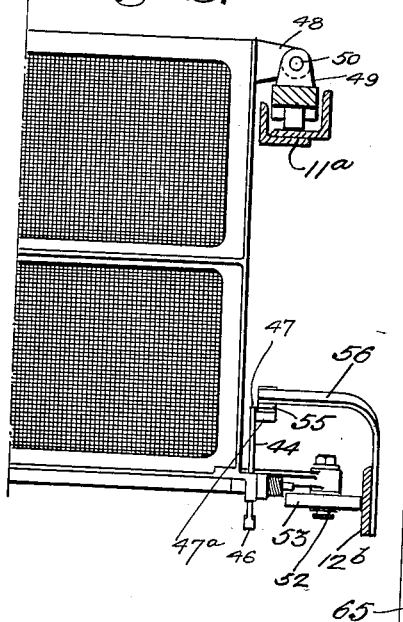
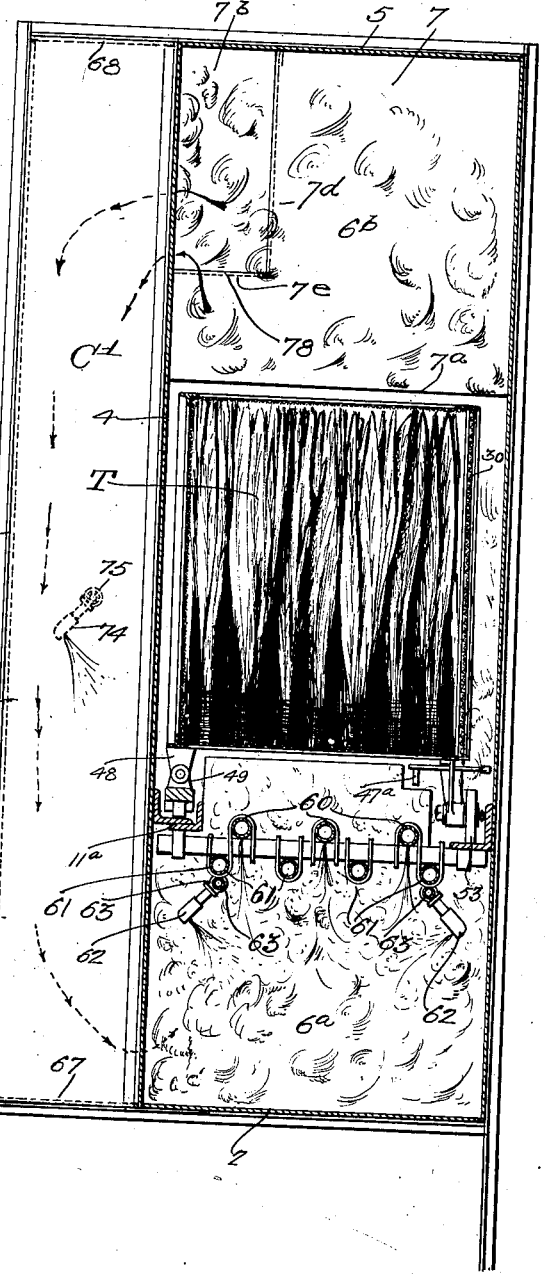
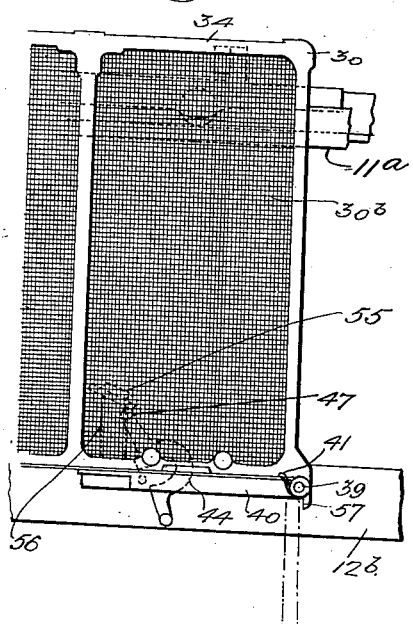

Feb. 22, 1938.   H. S. BOGATY   2,109,409
APPARATUS FOR BLENDING AND CONDITIONING TOBACCO
Filed Aug. 3, 1933   7 Sheets-Sheet 3
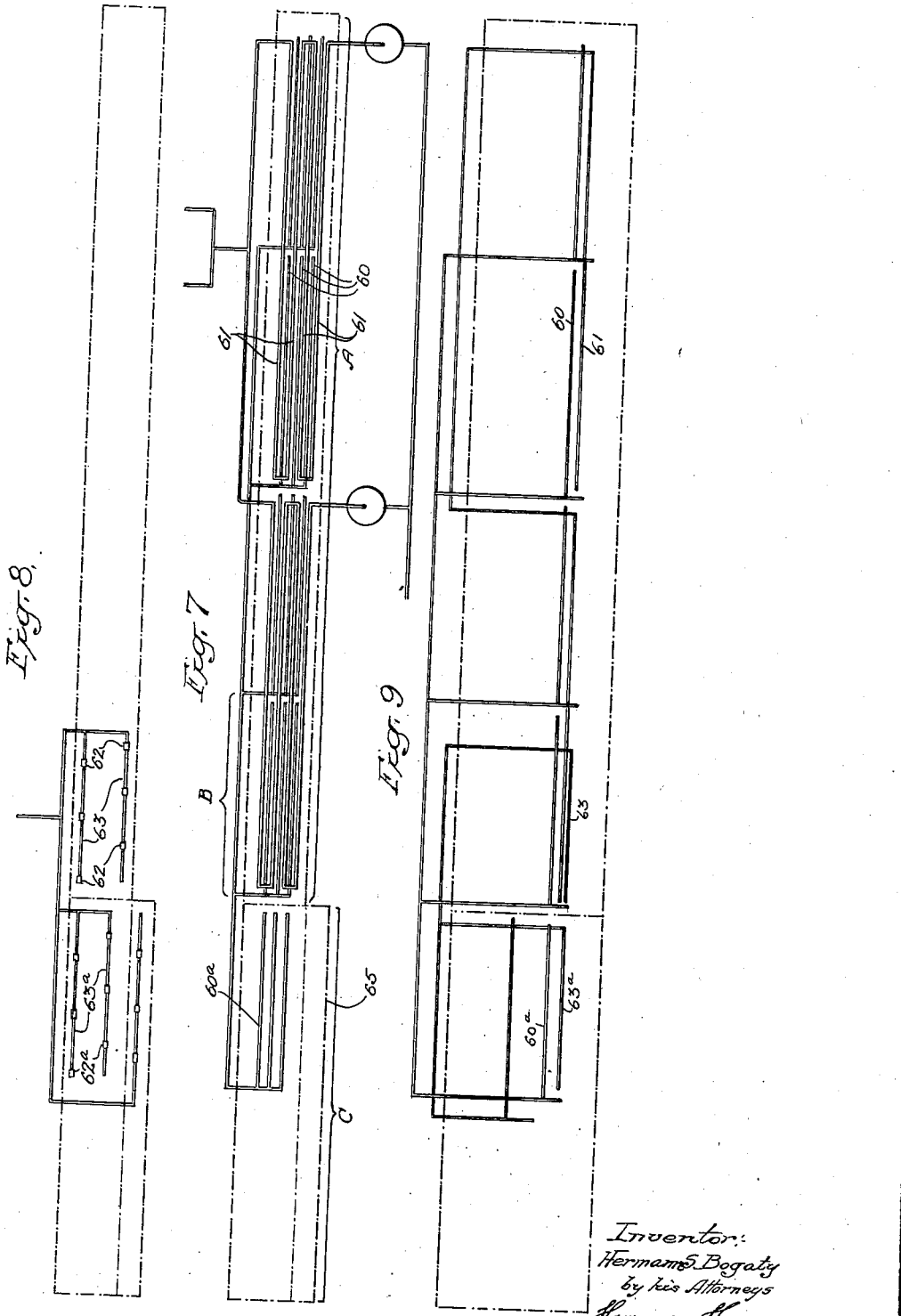

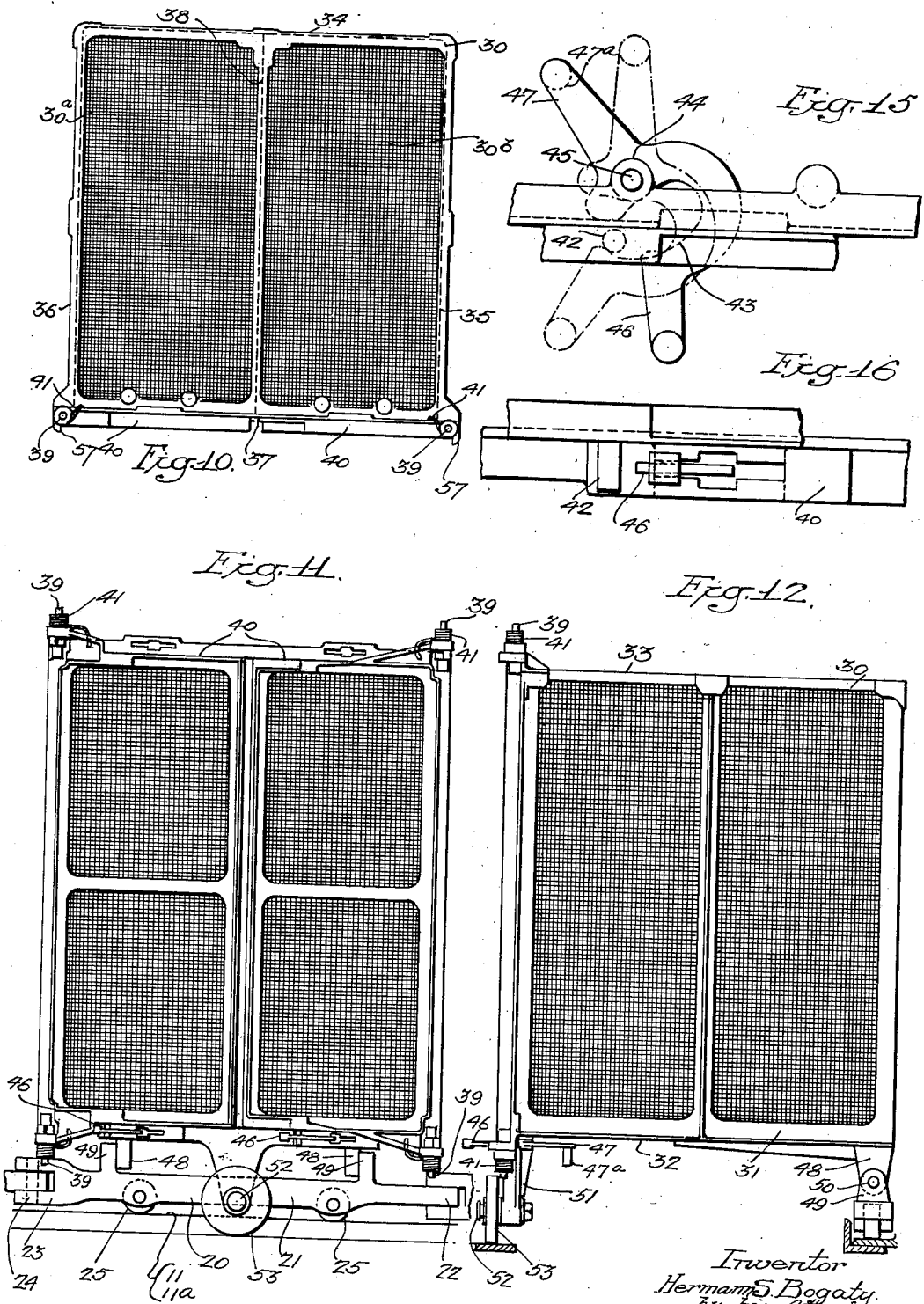

Feb. 22, 1938.
H. S. BOGATY
2,109,409
APPARATUS FOR BLENDING AND CONDITIONING TOBACCO
Filed Aug. 3, 1933
7 Sheets-Sheet 5
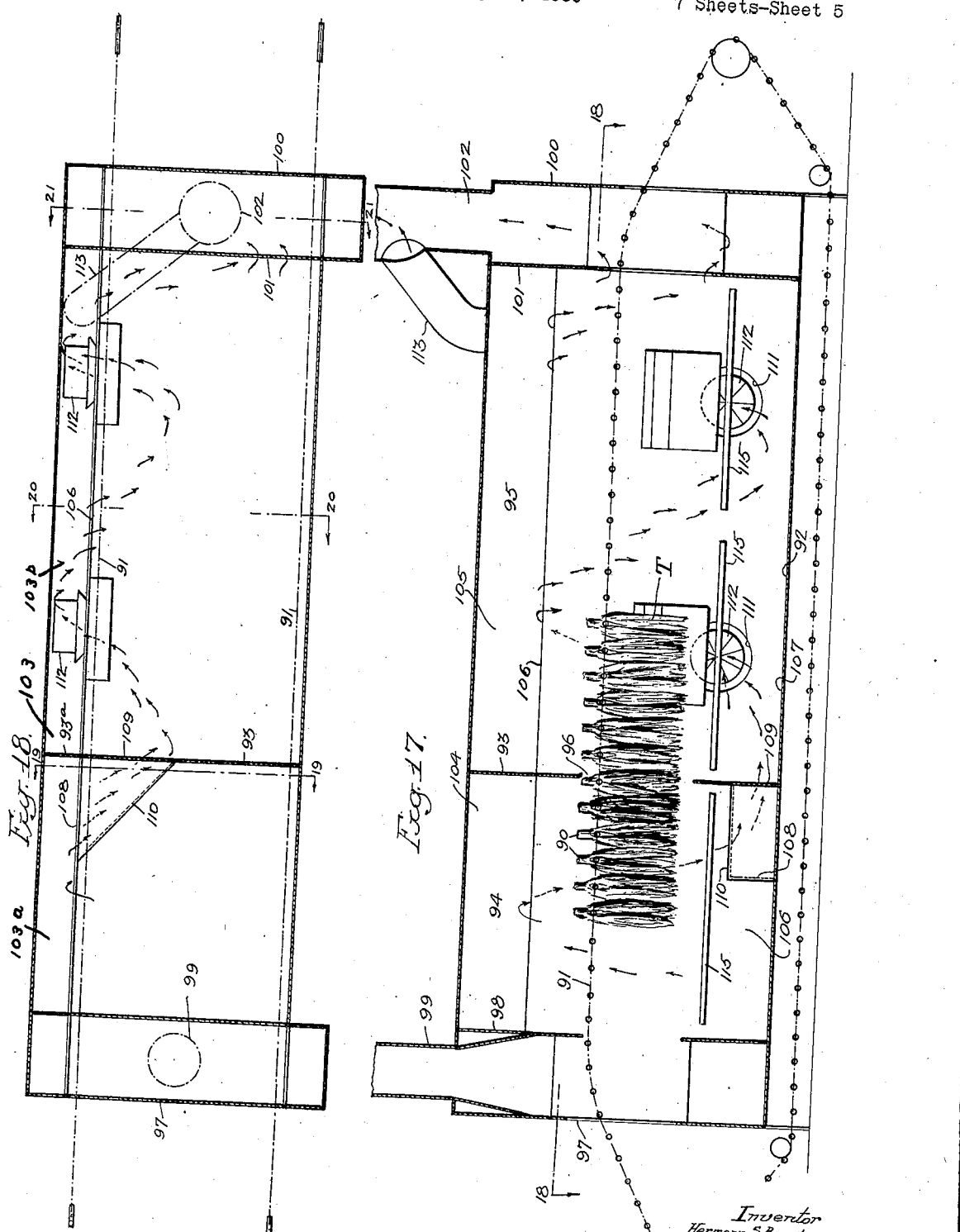
Inventor
Hermann S Bogaty
by his Attorneys Feb. 22, 1938.                    H. S. BOGATY                          2,109,409
                APPARATUS FOR BLENDING AND CONDITIONING TOBACCO
                        Filed Aug. 3, 1933              7 Sheets-Sheet 6
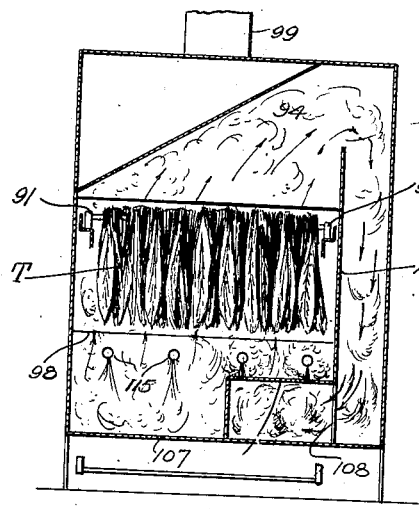
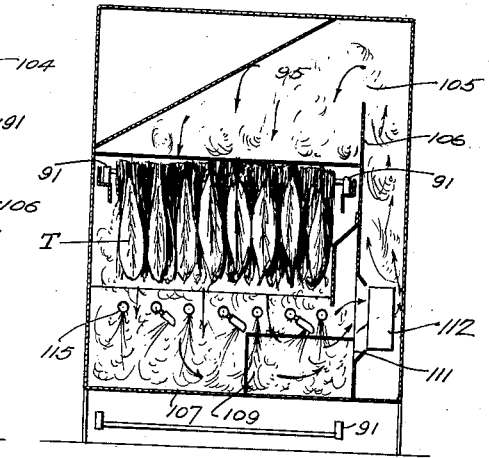
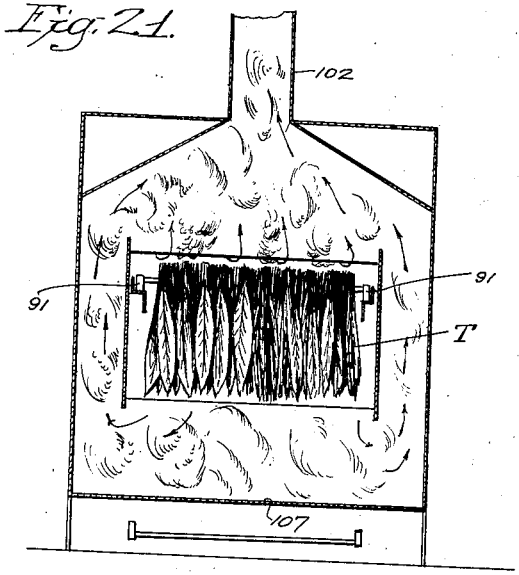
Inventor:
Hermann S. Bogaty,
by his Attorneys
Howson & Howson

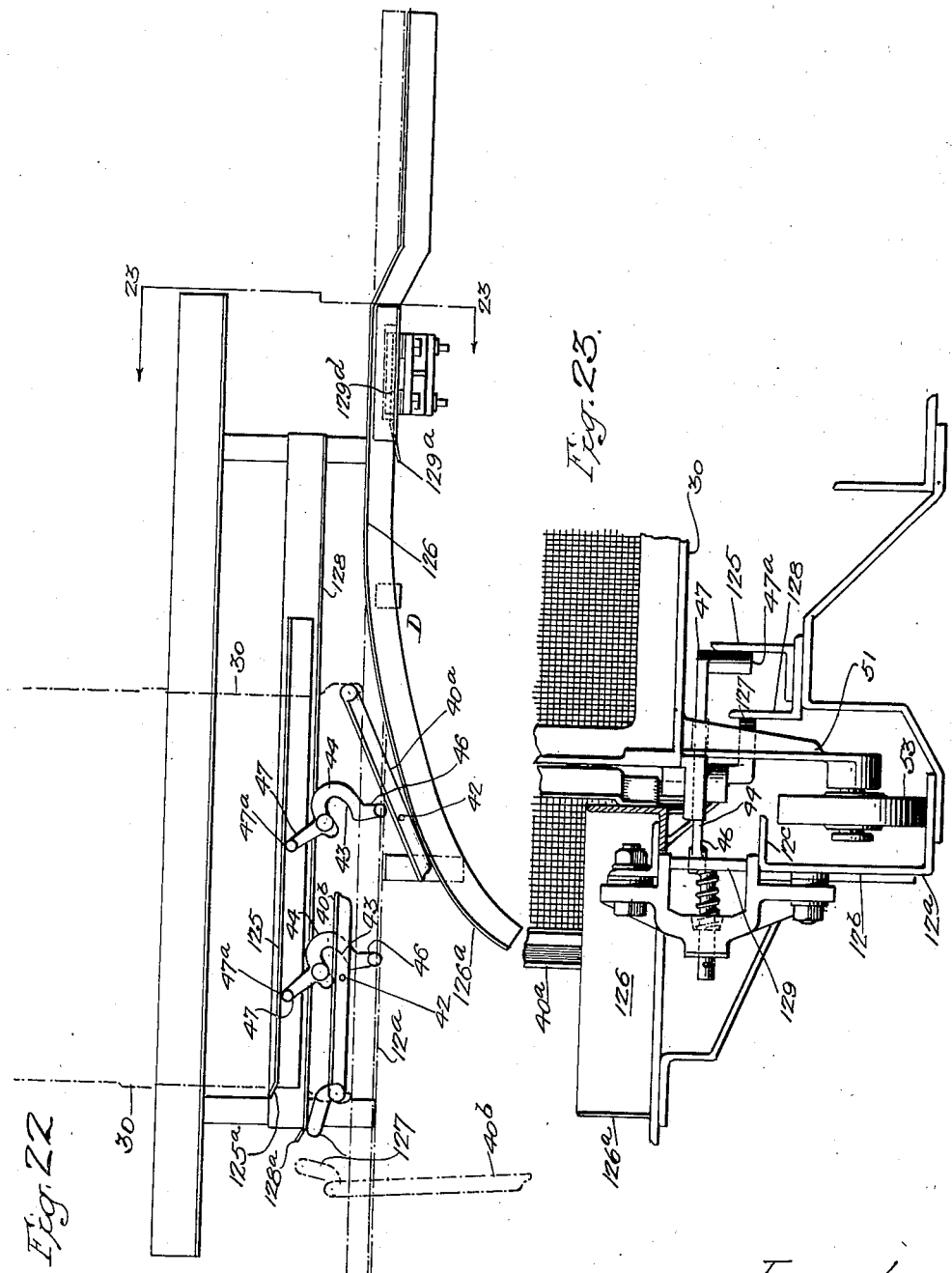

Patented Feb. 22, 1938

2,109,409

UNITED STATES PATENT OFFICE 2,109,409

APPARATUS FOR BLENDING AND CONDITIONING TOBACCO

Hermann S. Bogaty, Philadelphia, Pa., assignor to Proctor & Schwartz, Incorporated, Philadelphia, Pa., a corporation of Pennsylvania Application August 3, 1933, Serial No. 683,529

5 Claims. (Cl. 131—55)

This invention relates to an apparatus for blending and conditioning tobacco, particularly tobacco which has been formed into bundles each containing a predetermined number or quantity of leaves bound together at their stem ends, forming a head from which the leaves extend in more or less loose relation to each other.

In blending tobacco, to provide a mixture containing desirable qualities of two or more different varieties in correct proportions, it is customary to employ a long flat continuously moving endless belt conveyer comprising an upper carrying run and a lower idle return run disposed substantially in the same vertical plane, the belt passing around suitable drums or pulleys at each of the opposite ends of the two vertically spaced runs of the conveyer.

Substantially one-half of the carrying run of the conveyer, toward one end thereof, is at all times disposed within a conditioning chamber while the remainder of the carrying run of the conveyer is out in the open and extends beyond the receiving end of the conditioning chamber, to provide a loading and/or blending station in the apparatus.

The several varieties of tobacco to be blended are contained in hogsheads or other suitable receptacles disposed along the blending or loading station, adjacent the conveyer. From the different receptacles attendants take predetermined numbers of bundles of the different tobaccos and place them in flat superposed and overlapping relation to each other on the conveyer belt, as it passes by the sub-stations occupied by the respective attendants.

The loaded portion of the conveyer then passes into the conditioning chamber, wherein the tobacco is subjected to circulating currents of moisture-laden air by which the dry and more or less brittle tobacco leaves are softened and prepared for subsequent processing and from which the mixture is discharged into a hopper or on to another conveyer for transportation to the apparatus by which the next step in the processing of the blended mixture is accomplished.

The capacity of such a blending and conditioning apparatus is objectionably low, due to the necessity for keeping the layer of superposed horizontally disposed and overlapping tobacco leaves relatively thin on the conveyer, in order that the conditioning medium will penetrate to the center of the laminated layer.

Penetration to the center of the layer is at the best greatly retarded, and in thick layers prevented, by the overlapping relation of the superposed leaves, the uppermost of which presents a baffle or barrier to downwardly moving moisture-laden air currents and the undermost of the overlapping leaves presents a similar barrier to upwardly moving moisture-laden air currents, whereby the moisture is carried to and around the sides of the conveyer. Laterally moving air currents are undesirable because of their tendency to blow the leaves off the conveyer and to break the brittle leaves and scatter them on the conveyer so that the proportions of the different tobaccos at different places on the conveyer would not be uniform.

The principal object of the present invention is to increase the capacity of the blending and conditioning apparatus and to provide quick and substantially uniform penetration of the mass of leaves assembled on the conveyer by the conditioning medium. This object is primarily obtained by arranging the leaves in close laterally abutting substantially parallel vertical relation to each other in a substantially closed chamber or compartment, in the form of a more or less loosely compacted moisture pervious mass horizontally disposed in and extending substantially over the entire width of the chamber or compartment, throughout substantially the entire length of the compartment, and by passing the conditioning medium through the mass of leaves in a direction lengthwise of the leaves.

The bundles of leaves are preferably disposed on the conveyer with the heads extending downwardly and the leaves extending upwardly therefrom, in order to facilitate loading of the conveyer. Under such conditions the conditioning medium is passed upwardly through the mass of leaves, whereby the conditioning medium penetrates all portions of the assembled mass substantially simultaneously by passing between the bundles and between the leaves contained in each bundle in its movement lengthwise of the leaves.

The attainment of the above noted object is facilitated by the provision of an especially constructed conveyer which in its preferred form comprises a continuous series or train of rectangular box-like containers composed of perforated metal plate or wire mesh fabric stretched on a suitable framework, each container including a substantially flat normally horizontal base and top and relatively fixed back and side walls, while the front of each container is provided with hinged doors by which a predetermined number of bundles of leaves are confined in relatively close lateral more or less loose abutting relation to each other in the container, with the heads of the bundles resting on the horizontal base.

In order to facilitate loading and unloading of the containers said containers are connected to each other in a manner to permit relative tilting of the containers, first in one direction transversely of the normal longitudinal path of movement of the train for loading purposes, then in an opposite transverse direction for discharging the mass from the interior of the container.

By increasing the linear foot capacity of the conveyer and by passing the conditioning medium lengthwise of the leaves through the mass, whereby penetration of the mass by the conditioning medium is quickened, the length of the conditioning chamber may be proportionately shortened; and by providing the series of containers in a train the conveyer, instead of running in a vertical plane as described above, is permitted to be run in a horizontal plane; and the return run of the conveyer, instead of passing idly through or under the conditioning chamber, passes around and to one side of the conditioning chamber, whereby the return run is utilized for loading and unloading, thereby placing the loading or blending station at the one side of the conditioning chamber instead of its being at one end of the conditioning chamber and extending a considerable distance therefrom as above noted. Thus the total length of the conveyer including the carrying and return runs, is reduced to substantially one-half or less of the total length of the conveyers of the prior art, which constitutes a considerable saving of expense relative to the initial installation and subsequent maintenance.

Another feature of the invention resides in the manner of providing and forcing the conditioning medium through the masses of tobacco leaves carried by the respective containers. The loaded containers, upon entering the forward end of the conditioning chamber, are subjected first to saturated steam released under pressure below the conveyer and which, due to its own inherent pressure, is forced up through the mass of leaves carried by the containers, the moisture-laden steam being heated additionally by heating coils disposed below the conveyer. As the containers progress through the conditioning chamber toward the delivery end thereof the moisture content of the conditioning medium is increased, by the spraying of water into the already partially saturated steam, which tends to reduce the temperature of the leaves as an ante-cooling step in the process. The containers then pass into a cooling portion of the conditioning chamber wherein the heating coils are eliminated and into which the moisture-laden steam is drawn, from the forward steaming and intermediate ante-cooling portions of the conditioning chamber, and through which the comparatively cool steam or resultant vapor is circulated, the circulating conditioning medium being herein augmented by additional spraying of water thereinto, which further reduces the temperature thereof to a point where cooling of the tobacco leaves is readily accomplished thereby. In this manner the steam of highest temperature which is first passed through the tobacco and which normally would be exhausted into the outer atmosphere is utilized in the gradual cooling of the tobacco, thus affording a considerable saving in operating costs.

The construction of the apparatus will be fully disclosed hereinafter, reference being had to the accompanying drawings, of which:

Fig. 1 is a diagrammatic plan view of the preferred lay-out embodying the conditioning chamber and the loading station at one side thereof;

Fig. 2 is a diagrammatic side elevation of the apparatus shown in Fig. 1;

Fig. 3 is a transverse sectional elevation taken on the line 3—3, Fig. 2;

Fig. 4 is a transverse sectional elevation taken on the line 4—4, Fig. 2;

Fig. 5 is a fragmentary longitudinal sectional elevation taken on the line 5—5, Fig. 1;

Fig. 6 is an enlarged transverse sectional elevation taken on the line 6—6, Fig. 1;

Fig. 7 is a diagrammatic plan view of the steam spraying and heating piping within the conditioning chamber;

Fig. 8 is a diagrammatic plan view of the water piping in the cooling portion of the conditioning chamber;

Fig. 9 is a diagrammatic elevation of the piping shown in Figs. 7 and 8 combined;

Fig. 10 is an enlarged plan view of one of the rectangular containers of which the conveyer is composed;

Fig. 11 is a front elevation of the container shown in Fig. 10;

Fig. 12 is a side elevation of the container shown in Fig. 10;

Fig. 13 is a fragmentary sectional elevation showing one of the containers of Figs. 10, 11, and 12 as being tilted outwardly to discharge the contents of the container and the means for opening the doors of the container;

Fig. 14 is a fragmentary front elevation of the container shown in Fig. 13;

Fig. 15 is a detail plan view of the door locking mechanism;

Fig. 16 is a front elevation of the mechanism shown in Fig. 15;

Fig. 17 is a diagrammatic sectional elevation of a modified form of conditioning apparatus showing the tobacco bundles hung head up in a vertical position on transversely extending poles carried through the conditioning chamber by longitudinally moving side chains upon which the opposite ends of the poles rest;

Fig. 18 is a sectional plan view taken on the line 18—18, Fig. 17;

Fig. 19 is a transverse sectional elevation taken on the line 19—19, Fig. 18;

Fig. 20 is the transverse sectional elevation taken on the line 20—20, Fig. 18;

Fig. 21 is the transverse sectional elevation taken on the line 21—21, Fig. 18;

Fig. 22 is a plan view of an automatic means for closing the doors of the conveyer baskets; and Fig. 23 is a sectional elevation taken on the line 23—23, Fig. 22.

The apparatus shown in Figs. 1 to 6 inclusive comprises a casing 1 including a bottom or floor 2, side walls 3 and 4 and a roof 5, which collectively form a chamber 6 through which tobacco is conveyed for conditioning. The conditioning chamber may be said to be divided into two compartments by a transversely extending partition 7, the compartment at one side of the partition 7 being a steaming compartment indicated at A, and the compartment at the opposite side of said partition being a cooling chamber C. The end of the steaming chamber A immediately adjacent the partition 7 may be termed an ante-cooling chamber or section B, as will be readily seen hereinafter.

Extending completely through the casing 1 from end to end thereof are inner and outer rail sections 11 and 12 of a conveyer-supporting track 10, as shown in Figs. 1 and 2. The conveyer track 10 also comprises inner and outer rail sections 11a and 12a which are disposed outside and to one side of the casing 1. The outer rail sections 12a, 12a of the track 10 are connected at the opposite ends of the casing 1 by curved sections 13 and 14 respectively. The inner rails sections 11 and 11a of the track 10 terminate adjacent the opposite ends of the casing 1, in line with the pitch circles of sprocket wheels 15 and 16 which are disposed in horizontal planes and rotate about vertically extending axes of drive shafts 17 and 18, to which the sprocket wheels 15 and 16 are respectively secured.

Running on and supported by the rails 11, 11a and passing around the sprockets 15 and 16 is an endless conveyer chain 20, which, as illustrated in Fig. 11, comprises a series of links 21 having male and female ends 22 and 23 respectively, which are adapted to be connected to the ends of the adjacent links, to complete the endless chain 20, by vertically extending pintles 24.

Each of the links 21 is provided with a pair of supporting rollers 25 rotatably mounted in the link and adapted to ride on the upper surfaces of the rails 11, 11a, and on horizontal flanges 15a and 16a of the sprockets 15 and 16 respectively, which are disposed in the same horizontal plane as the rails 11, 11a of the track 10, whereby the chain 20 will travel at all times in a horizontal plane as its passes along the rails 11, 11a and around the sprockets 15 and 16.

Each of the links 21 carries one of the rectangular containers into which the tobacco is placed for conditioning. Each container 30 comprises a rigid skeleton frame 31 including a base 32, a top 33, a back 34, sides 35 and 36 and a front 37. The top, bottom, back and sides of the container frame 31 are closed with wire mesh screen or perforated plate permitting free circulation of the conditioning medium through the container as the container is conveyed through the casing 1.

The front 37 of the container is open and is adapted to be closed to confine the tobacco within the interior of the container by doors 40, 40 which are hinged to the front 37 of the container 30 at 39, 39. The interior of the container 40 is divided in half, to form compartments 30a and 30b, by a transversely extending perforated plate or wire mesh partition 38, extending from the back 34 to the front 37 of said container. Access to the said compartments 30a and 30b may be had by opening the doors 40, 40 which respectively close the said compartments 30a and 30b at the front thereof.

Springs 41, 41 each having one end secured to one of the pivots 39 and the opposite end bearing against the inside of the frame of each of the doors 40 tends to swing the doors open at all times, such tendency normally being resisted and the door being locked in container-closing position by a pin 42 projecting downwardly from each of the frames of the doors 40 and engaged by a cam surface 43 of a latch 44 which is pivoted at 45 to the underside of the bottom 32 of the container 30. The latch 44 is provided with a handle 46 adapted for swinging the latch about its pivot to engage the cam surface 43 with the pin 42, for rigidly locking the door in a closed position. The latch 44 is also provided with a rearwardly extending arm 47 provided with a downwardly extending lug 47a adapted to engage a latch-releasing cam fixed in and at a predetermined position along the track 10, as will be hereinafter described.

Each container 30 is provided with a pair of depending hinge lugs 48 which are pivotally connected to hinge lugs 49, 49 carried by each of the chain links 21, by pivot pins 50, 50.

Projecting downwardly from the central front portion of the bottom frame 32 is a bracket 51 in which is secured a stud or axle 52 for rotatably receiving a roller or wheel 53 which is adapted to ride on the outer rails 12 and 12a of the track 10.

The loading of the containers 30 is accomplished at a loading station D along a section of that portion of the track 10 which is disposed outside the casing 1, intermediate the opposite ends thereof. The receptacles containing the different varieties of tobacco to be blended are disposed adjacent the track 10 along the loading station D to be readily accessible to the attendants loading the conveyer consisting of the train of containers 30, 30.

Each of the containers 30 is adapted to be tilted rearwardly, as indicated in Fig. 3, in one direction transversely of the track 10 and for this purpose a portion 12b of the outer rail 12a is elevated above the horizontal plane of the rail section 12. The portion 12b of the said outer rail is provided with an inturned flange 12c disposed above and overhanging the tops of the container rollers 53, to prevent tilting of the containers 30 beyond a predetermined angle.

The containers 30 are tilted rearwardly for the purpose of facilitating the loading of the compartments 30a and 30b of each container with the bundles of tobacco leaves from the various receptacles disposed along the loading station D. In loading the containers 30 the tobacco leaves of the several varieties are laid in an upright position against the rearwardly inclined back wall 34 of the container with the heads of the bundles resting on the correspondingly rearwardly tilted bottom 32 of the container. The bundles are loosely packed in the container in this manner until full, whereupon the doors 40, 40 are closed and locked by the latches 44 by the attendant nearest the far end $d$ of the loading station D, or automatically by means located near the said end of the loading station, as the train of containers moves in the direction of the arrow $a$, Fig. 1.

The outer rail 12a is inclined as illustrated at 12d from the level of the one end of the elevated portion 12c to the level of the curved end section 13 of said outer rail, said curved section being in such a plane relative to the horizontal plane of the flange 15a of the sprocket 15 as to move the containers from the rearwardly tilted positions shown in Fig. 3 to the substantially horizontal or level positions shown in Fig. 4, as the sprocket 15 rotates and moves the train of conveyer containers from that portion of the track 10 outside the casing 1 on to that portion of the track within the casing 1, said containers entering the casing 1 at the end E thereof and continuing in the level positions completely through the said casing, from which the containers successively emerge at the end F thereof.

As the containers are carried around the sprockets 16 the curved end 14 of the outer rail of the track 10 begins to fall away vertically and inwardly toward the axis of the sprocket, as indicated at 14a in Figs. 1 and 2. The said curved portion 14a of the outer rail of the track 10 merges with a compound curved portion 12e of the outer rail 12a, which in turn merges into a vertically disposed portion 12f of the rail.

As the containers move around sprocket 16 the wheels 53 of the containers ride the inwardly descending portion 14a of the curved end 14 of said rail, which causes the containers to tilt outwardly as indicated in Figs. 2 and 5, and as the movement of the containers continues and the wheels 53 ride the compound curved portion 12e of the said outer rail and on to the vertical portion 12f thereof the said containers 30 are tilted to a position substantially at 90° with respect to the normal level position in which they travel through the casing 1, such position being clearly illustrated in Fig. 4.

As each container moves into a position wherein its roller 53 is in engagement with the vertical portion 12f of the outer rail 12a the doors 40 of the containers 30 are automatically opened by the lugs 47a of the latches 44 engaging an inclined cam 55, which is supported in a fixed position adjacent the vertical portion 12f of the outer rail by a bracket 56, as clearly indicated in Figs. 13 and 14. As the latches 44 successively release the doors 40 of the containers 30 the doors 40 are swung open to the position shown in Fig. 4 by the springs 41 whereby the entire contents of each compartment of each container 30 is discharged from the container, in the present instance on to the carrying run of a belt conveyer 60 by which the mixture of tobacco within the containers is transported to the apparatus for accomplishing the next step in the processing of the mixture.

The doors 40 are each maintained in an open position substantially in alignment with the side walls 35 and 36 of the container by the springs 39 pressing the said doors against stop lugs 57 formed on the front 37 of the frame of the container.

With the doors of the container open, the said containers then pass from the discharging station G to the receiving end $d^1$ of the loading station D, said containers being moved from the extreme forwardly tilted position in Fig. 4 to the rearwardly tilted loading position shown in Fig. 3, by the wheels 53 riding an outwardly and upwardly bent compound curved portion 12g of the outer rail 12a.

The sprockets 15 and 16, either or both, may be driven by any suitable motive power through any suitable type of power transmission, for driving the chain 20 continuously or intermittently, as occasion may demand or as may be desired, for carrying the train of conveyer containers along the course and through the cycle of movements described above.

The conditioning medium employed in the present instance is a comparatively wet steam which is jetted into the lower portion 6a of the conditioning chamber 6 through and by a series of perforated pipes 60, which are horizontally disposed below the bottom of the train of conveyer containers 30 and extend longitudinally of the chamber 6, as clearly illustrated in Figs. 3, 4, 6, 7, and 9. The pipes 60 are perforated on their lower sides to direct the jets of steam downwardly toward the floor 2 of the said chamber for tempering before contacting the tobacco in the containers.

Adjacent and substantially parallel to the steam jet pipes 60 is a series of heating pipes 61 by which the temperature of the steam in the lower portion 6a of the chamber 6 may be controlled as desired. The steam escapes from the pipes 60 at a predetermined pressure and builds up in the lower portion 6a of the chamber 6 from which and by its own pressure the steam ascends in the chamber 6 and is forced through the perforated bottoms of the containers into and through the mass of tobacco T in each of the compartments of each container.

The fronts and backs of the containers 30 are so closely positioned with respect to the walls 3 and 4 of the chamber 6 and the containers 30 of the train are positioned in such close relation to each other longitudinally of the conveyer as to prevent excessive amounts of the conditioning medium from passing around the containers, thereby forcing the conditioning medium to pass upwardly through the containers, whereby the said conditioning medium must of necessity find passage through the mass in each container, between the bundles and between the leaves of the individual bundles of tobacco, whereby the entire contents of each container is subjected to contact with the conditioning medium substantially simultaneously.

The conditioning medium after rising through the containers 30 and the tobacco confined therein accumulates in the upper portion 6b of the chamber 6 through which the said medium passes longitudinally of the casing 1 toward the delivery end thereof, as will be hereinafter described.

In that portion of the steaming compartment A immediately adjacent the transverse partition 7, the steam being jetted from the pipes 60 is augmented by water sprayed from spray heads 62 fed by water pipes 63 which run substantially parallel to the steam jet and heating pipes 60 and 61. The heads 62 spray the water into the body of steam in the lower portion 6a of the chamber 6 and the temperature of the conditioning medium is thereby reduced to some extent below the temperature of the conditioning medium in the forward or receiving end of the chamber 6 and as this augmented steam rises through the containers disposed adjacent the partition 7 within the steaming compartment A the temperature of the tobacco will be correspondingly reduced, in what may be termed an antecooling step in the conditioning process.

The partition 7 as clearly illustrated in Fig. 6, is provided with an opening 7a sufficiently large to permit the containers 30 to pass through from the steaming compartment A to the cooling compartment C, wherein the heating pipes are eliminated and a series of steam jet pipes 60a are provided, together with a series of water pipes 63a provided with spray heads 62a by which the temperature and/or moisture content of the conditioning medium are governed.

Adjacent and running longitudinally of and parallel with the cooling compartment C, the casing 1 is provided with a lateral extension 65 forming a circulating chamber or compartment $C^1$, adjacent the cooling chamber or compartment C, said extension 65 comprising a wall 66 substantially parallel to the side wall 4 of the casing 1, a floor 67 in the plane of the floor 2 of the compartment 6, a roof 68 in the plane of the roof 5 of the casing 1, an end wall 69 substantially in the plane of the partition 7 and an end wall 70 substantially in the plane of the end wall at the discharge end F of the casing 1.

It will be here noted that the casing 1 is provided with end walls 71 and 72 at the receiving end E and discharge end F thereof respectively which, like the partition 7, are provided with openings just sufficiently large to permit of the passage of the containers 30 into and out of the conditioning chamber 6.

The conditioning medium is circulated upwardly through the cooling compartment C and downwardly through the circulating chamber C¹ and is drawn from the upper portion of the chamber C and discharged into the lower portion 6a of the said chamber C through openings 77 and 73 formed in the upper and lower portions respectively of that part of the wall 4 disposed between the cooling compartment C and circulating chamber C¹.

In its downward course through the chamber C¹, the conditioning medium is further cooled and saturated with water from spray heads 74 fed by the water pipe 75 extending longitudinally of the circulating chamber C¹.

The spent steam in the upper portion 6b of the steaming compartment A is drawn toward and through an opening 7b formed in the upper portion of the partition 7 by means of circulating fans 76 disposed in the openings 77 formed in the upper portion of the wall 4 between the cooling compartment C and the circulating chamber C¹, as clearly illustrated in Figs. 2 and 4.

Adjacent each of the openings 77 a longitudinally extending inclined baffle 78 is provided which directs the flow of conditioning medium outwardly toward the center of the chamber 6 before permitting it to be drawn through the openings 77 by the fans 76.

In this manner the spent steam in the upper portion 6b of the standing compartment A which normally would be exhausted to the outer atmosphere is carried or drawn into the cooling chamber and its temperature reduced for cooling of the tobacco by the spraying of the water from the heads 62a and 74.

The flow of conditioning medium passing from the steaming compartment A into the cooling compartment C is directed first into the one end of the circulating chamber C¹ by an angularly disposed baffle 7d and a flat bottom plate 7e extending from the partition 7 to the wall 4 around the opening 7d in the said partition 7.

The circulating fans 76 in addition to circulating the conditioning medium through the cooling chamber C and circulating chamber C¹ cause the conditioning medium to move longitudinally through the whole of casing 1 toward the delivery end thereof from which the conditioning medium is finally exhausted through a suitable flue 79.

The portion of the cooling compartment C immediately adjacent the delivery end of the casing 1 is devoid of all piping and the conditioning medium is merely circulated through the compartment C and chamber C¹ and through the containers of tobacco within the compartment C by the second fan 76a.

If desired a portion of the conditioning medium may be exhausted from an intermediate portion of the cooling compartment C through a flue 80; and if desired, a flue 81 may be provided adjacent the receiving end of the casing 1 to exhaust a portion of the steam therefrom immediately adjacent the opening in the wall 71, to carry off such steam as would tend to pass out of the casing through the container entrance opening in the end wall 71.

Figs. 17 to 21 inclusive illustrate a modified form of the invention wherein the bundles of tobacco T are hung, heads up, on sticks or poles 90 which are supported at their opposite ends by and on horizontally moving chains or belts 91, 91 which pass longitudinally through a conditioning chamber provided in and by a casing 92. The casing 92 is provided with a partition 93 which divides the interior of the casing 92 into two separate compartments 94 and 95. The partition 93 is provided with an opening 96 through which the tobacco passes from one compartment to the next.

Adjacent the receiving end of the casing 92 and substantially parallel to the end wall 97 thereof the said casing is provided with a partition 98, forming an end compartment which communicates with the flue 99 by which conditioning medium may be discharged from the receiving end of the casing 92.

Spaced inwardly from the end wall 100, at the discharge end of the casing 92, is a similar partition 101 which provides a second end compartment communicating with a flue 102, for exhausting the conditioning medium from the discharge end of the casing 92. A supplementary flue 113 communicates with the interior of the casing 92 adjacent the partition 101, for exhausting the conditioning medium from the compartment 95 of said casing.

Along one of its sides the casing 92 is provided with a circulating chamber 103 which is divided by a partition 93a into two compartments 103a and 103b which communicate respectively with the interiors of the conditioning compartments 94 and 95, through openings 104 and 105 formed in the upper portion of the side wall 106 of said casing, which separates the compartments 94 and 95 from the compartments 103a and 103b.

Adjacent the partition 93 and the floor 107 of the casing 92 the side wall 106 is provided with an opening 108 which communicates with an opening 109 formed in the lower portion of the partition 93 by a conduit 110.

In the side wall 106, within the chamber 95 and adjacent the floor 107, the side wall 106 is provided with openings 111, 111 in which are disposed circulating fans 112, 112. The circulating fans 112 draw the conditioning medium from the lower portion of the compartment 95, and also from the lower portion of the circulating compartment 103a through the conduit 110, and force said conditioning medium upwardly through the circulating compartment 103b, from which the conditioning medium passes laterally through the opening 105 into the conditioning compartment 95, thence downwardly through the bundles of tobacco T being carried through said chamber by the chains 91.

The lower portions of the compartments 94 and 95 are provided with steam jets and water spray pipes and, if desired, heating pipes, which supply the conditioning medium to the lower portion of the casing 92.

In the steaming compartment 94 the conditioning medium rises of its own pressure, through the downwardly hanging tobacco bundles T and passes into the upper portion of the conditioning or steaming chamber 94 from which the steam passes laterally through the opening 104 into the circulating compartment 103a, at one side of the partition 93a, thence downwardly and through the conduit 110 into the lower portion of the compartment 95. The conditioning medium then is drawn through the ports 11, 11 from the lower portion of the compartment 95 into the circulating chamber 103b at the opposite side of the partition 93a, wherein the conditioning medium is forced upwardly and thence through the opening 105 in the side wall 106 to the upper portion of the chamber 95, wherein the conditioning medium by reason of the circulation created by the fans 112 moves downwardly through the tobacco and again into and through the ports 111, a portion of the conditioning medium finally being discharged from the one end of the compartment 95 through the flue 113 while that portion of the conditioning medium which passes through the opening in the partition 101 with the tobacco rises in the extreme end of the casing 92 and is drawn therefrom by the flue 102.

In a foregoing portion of the specification the doors 40, 40 of the containers 30 are described as being closed by the attendant nearest the far end of the loading station D, or by automatic means located near the said end of the loading platform. Such means is clearly shown in Figs. 22 and 23, wherein, as the containers 30 move along the track 10 in the direction of the arrow a, Fig. 1, and near the end d of the loading station D, with the doors 40 of the containers open, the ends 47a of the arms 47 of the latches 44 engage a flared end 125a of a rail or angle bar 125 which is rigidly mounted adjacent and extends parallel to the rail 12a of the track 10, see Figs. 22 and 23, to first assure the positions of the latches correctly for passage of the locking pins 42 on the doors 40 into position to be engaged by the cam surfaces 43 of the latches.

The leading door 40a, i. e. the door toward the right side of each container is closed by the door engaging an outwardly flared end 126a of a rail 126 rigidly secured to, adjacent and above the rail 12a of the track 10.

The trailing door, i. e. the door toward the left side of each container is provided with a lug or arm 127, which, as the container moves along the track 10, engages a flared end 128a of a fixed rail 128, paralleling the rails 12a and 125, which swings the door 40b into a closed position.

The doors are held in their closed positions by the rails 126 and 128 until the container reaches the extreme end d of the loading station D, whereupon the outer ends of the latch arms 46 engage a flared end 129a on a spring-pressed plate 129, which swings the latches 44 into their door locking positions before described.

The automatic door closing attachment above described is preferable to the manual closing of the doors, however, the doors may be closed manually and the automatic closing attachment provided as a safety means should the attendant for some reason fail to close one or more of the container doors, and in any event the spring-pressed plate 129 will function to press the latches 44 firmly into their door locking positions before the containers are tilted forwardly from their rearwardly inclined loading positions to their normal horizontal or level positions in which they travel through the conditioning chamber.

I claim:

1. A tobacco-conditioning apparatus comprising a relatively long primary compartment and a relatively short secondary compartment through which the material passes successively, means for supporting the material in transit in a compacted moisture pervious mass horizontally disposed over substantially the entire width of the compartments, means for initially supplying a conditioning medium to the primary compartment under pressure below said mass for a single passage upwardly through the material under its own pressure to an exhaust space therein, means affording communication between the exhaust space of the primary compartment and the under-mass portion of the secondary compartment, and means for circulating the conditioning medium in the secondary compartment through the material therein to draw the single passage conditioning medium into the secondary compartment from the exhaust space of the primary compartment.

2. A tobacco-conditioning apparatus comprising a relatively long primary compartment and a relatively short secondary compartment through which the material passes successively, a circulating compartment adjacent said secondary compartment, means for supporting the material in transit in a compacted moisture pervious mass horizontally disposed over substantially the entire width of the compartments, means for initially supplying a conditioning medium to the primary compartment under pressure below said mass for a single passage upwardly through the material under its own pressure to an exhaust space therein and extending substantially the full length thereof, means for circulating the conditioning medium in the secondary and circulating compartments upwardly through the mass, and means affording communication between the circulating compartment and the exhaust space of the primary compartment adjacent the end thereof from which the material passes to the secondary compartment for drawing the single passage conditioning medium longitudinally through the exhaust space of the primary compartment into the circulating compartment for circulation in the secondary compartment.

3. A tobacco-conditioning apparatus comprising a relatively long primary compartment and a relatively short secondary compartment through which the material passes successively, a circulating compartment adjacent said secondary compartment, means for supporting the material in transit in a compacted moisture pervious mass horizontally disposed over substantially the entire width of the compartments, means for initially supplying a conditioning medium to the primary compartment under pressure below said mass for a single passage upwardly through the material under its own pressure to an exhaust space therein and extending substantially the full length thereof, means for circulating the conditioning medium in the secondary and circulating compartments upwardly through the mass, means affording communication between the circulating compartment and the exhaust space of the primary compartment adjacent the end thereof from which the material passes to the secondary compartment for drawing the single passage conditioning medium longitudinally through the exhaust space of the primary compartment into the circulating compartment for circulation in the secondary compartment, means in the secondary and circulating compartments for augmenting the conditioning medium in circulation in said secondary and circulating compartments adjacent the material entrance end of the secondary compartment, and means adjacent the material exit end of the secondary compartment for circulating the augmented conditioning medium through the secondary and circulating compartments.

4. A tobacco-conditioning apparatus comprising a conditioning chamber, a partition extending transversely of the conditioning chamber dividing said chamber into a relatively long primary compartment and a relatively short secondary compartment through which and an opening in said partition the material passes successively from end to end of the conditioning chamber, means for supporting the material in transit in a compacted moisture pervious mass horizontally disposed over substantially the entire width of the compartments, a circulating chamber laterally adjacent and extending substantially the full length of the secondary compartment, a conduit affording communication between the material exit end of the primary compartment and the circulating chamber, means initially supplying a conditioning medium to the primary compartment under pressure below said mass to force its way under its own pressure upwardly through said mass to the upper portion of the primary compartment above said mass for single passage upwardly through said material and circulating means between the secondary compartment and the circulation chamber for drawing the single passage conditioning medium through the conduit from the primary compartment and into the circulating chamber for circulation in the secondary compartment.

5. A tobacco-conditioning apparatus comprising a relatively long primary compartment and a relatively short secondary compartment through which the material passes successively, means for supporting the material in transit in a compacted moisture pervious mass horizontally disposed over substantially the entire width of the compartments, a series of jets for projecting conditioning steam into the primary chamber below the material to rise under inherent pressure of the steam in a single passage through said material to an exhaust space above said material, means affording communication between the exhaust space of the primary compartment and the secondary compartment, and means for circulating the conditioning steam in the secondary compartment and drawing said single passage steam from the exhaust space of the primary compartment into the secondary compartment.

HERMANN S. BOGATY.